United States Patent [19]

Xiang

[11] Patent Number: 5,533,787
[45] Date of Patent: Jul. 9, 1996

[54] ADD-ON ADJUSTABLE BACK SUPPORT FOR CAR SEAT

[76] Inventor: Kun Xiang, 110 Pacific Ave., #239, San Francisco, Calif. 94111

[21] Appl. No.: 218,338

[22] Filed: Mar. 25, 1994

[51] Int. Cl.$^6$ .................................................. A47C 7/42
[52] U.S. Cl. .................. 297/284.5; 297/284.3; 297/DIG. 6; 297/228.12; 297/228.11; 297/228.1
[58] Field of Search .................... 297/DIG. 6, 440.11, 297/397, 440.1, 410, 284.3, 284.4, 284.5, 284.6, 284.1, 218, 284.7, 440.14, 219.1, 220, 224, 228.1, 228.11, 181, 219.12, 225, 228, 228.12, 229, 230.14, 230.1; 5/922

[56] References Cited

U.S. PATENT DOCUMENTS

| | | | |
|---|---|---|---|
| 2,226,505 | 12/1941 | McCormick | 297/228.1 |
| 3,279,849 | 10/1966 | Radke et al. | 297/284.7 X |
| 3,542,421 | 11/1970 | Ambrose | 297/284.1 X |
| 4,876,755 | 10/1989 | Parrish | 297/284.5 x |
| 5,023,125 | 6/1991 | Gray | 297/228.12 X |
| 5,149,173 | 9/1992 | Jay et al. | 297/DIG. 6 X |
| 5,154,477 | 10/1992 | Lacy | 297/397 |
| 5,171,064 | 12/1992 | Boussaroque | 297/284.4 X |
| 5,211,446 | 5/1993 | Jay et al. | 297/284.7 X |
| 5,310,245 | 5/1994 | Lyszczasz | 297/DIG. 6 X |

*Primary Examiner*—Milton Nelson, Jr.

[57] ABSTRACT

An adjustable back support device comprises a seat cover snugly enclosing the seat back of a car seat, and a basic set of three cushions. The seat cover and the shells of the cushions are made of fastening-loop fabric. The cushions also include fastening-hook strips disposed thereon, so that they can be individually attached to the seat cover for supporting different parts of a user's body, such as the neck, upper back, and lumbar area. The cushions can be easily and precisely positioned to suit individual users, and can be attached anywhere on the seat cover for supporting other parts of a user's body. Fewer or more cushions can be used if desired to suit individual preferences.

2 Claims, 2 Drawing Sheets

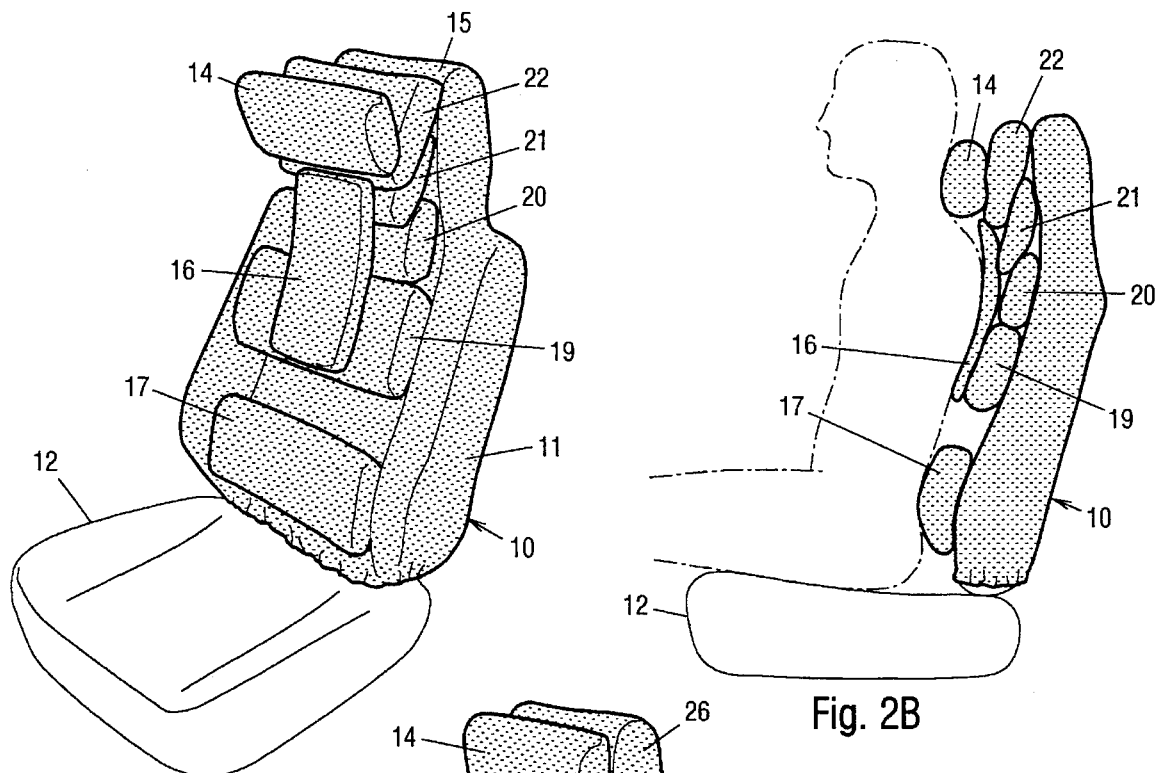
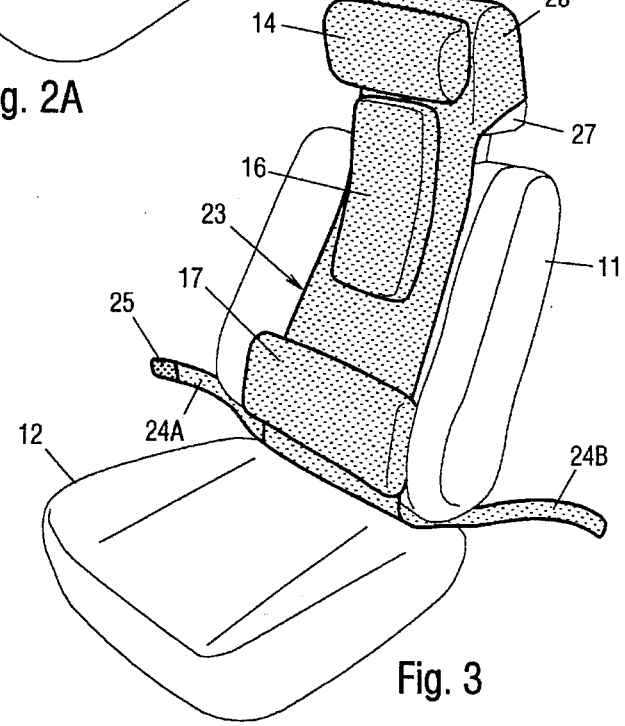
Fig. 2A
Fig. 2B
Fig. 3

ADD-ON ADJUSTABLE BACK SUPPORT FOR CAR SEAT

FIELD OF THE INVENTION

This invention relates generally to car seats, specifically to a user-adjustable back support for attaching to existing car seats.

BACKGROUND OF THE INVENTION

The best posture for a person to assume when standing is to place the chest forward, shoulders back, and curve the lower back forwardly. For best comfort and health, this posture should be maintained even when the person is seated. A seat or chair which does not help maintain this posture will cause discomfort after prolonged use, or even injury to the back, shoulder, and neck over the very long term.

A typical car seat generally has a lumbar support, or the portion of a seat back which curves outwardly to support the user's lower back. Some seats have lumbar supports which are adjustable in thickness or firmness by employing internal mechanisms or pump-up bladders. These allow each user to adjust the lumber support for the best personal fit and comfort. However, the range of adjustment is generally not enough to satisfy all users, so that some will be unable to find a comfortable setting. Even new cars are criticized by magazine reviewers for lacking in seating comfort, with the lack of sufficient lumbar support being a common complaint.

A typical car seat also has a headrest, or a portion which extends from the seat back to head level. It is primarily designed to prevent neck injury during a rear collision. It is normally positioned away from the user's head, so that it is not really used for resting. Some headrests are adjustable only in height. Some can also be pivoted fore and aft, but none can be positioned forwardly enough to support a person's head in its normal, upright position. In addition, headrests are usually too firm, so that if a person leans on one while driving, the car's movement will cause the head to bounce about on the headrest. No car seat offers neck support, so that neck muscles can often tighten after prolonged driving. Also the upper seat back is usually flat, therefore it causes the shoulders to curve forwardly as the back rests thereon.

Add-on back supports have been produced to add lumbar support to car seats lacking in this feature, or to enhance those with insufficient lumbar support. A typical device is secured to the seat with straps, and includes a foam cushion with a backing board. Although these cushions add much needed lumbar support to older car seats, none offer any adjustability, so that few users find them ideal.

Even the best available car seats cannot make every user comfortable, despite having adjustable lumbar supports and headrests. Because the seats are not usually the primary concern in a buying decision, people will buy cars with uncomfortable seats. Unfortunately, these owners will have to endure these less-than-ideal seats for years to come. Moreover, their lack of neck support causes neck strain. Although add-on back supports can be used, their lumbar supports are not adjustable, and they provide no neck support at all.

SUMMARY OF THE INVENTION

Accordingly, the present invention aims to provide an adjustable back support for car seats with the following objects and advantages:

(a) provides lumbar, upper back, and neck support, and positions the shoulders, (b) user adjustable and customizable for the best individual fit to maximize comfort, (c) great range of thickness and support positions possible to suit every user, (d) easily installs onto any car seat, (e) easily removed for cleaning, and (f) economical to manufacture.

These objects and advantages are achieved with a device including a fitted seat cover snugly surrounding the seat back of a car seat. The cover is made of fastener-loop fabric. A set of three different cushions have fastening-hook strips disposed on their back sides for attaching the cushions to the cover. A cylindrical cushion is attached horizontally to the headrest for supporting the neck and head of a user, a rectangular cushion is attached vertically to the upper side of the seat back for supporting the upper back, and a larger rectangular cushion is attached to the lower side of the seat back for supporting the lower back or lumbar area of the user.

The hook-and-loop fasteners allow the cushions to be removably attachable at different positions to suit individual users. Fewer cushions can be used if desired. On the other hand, more cushions can be used for more support in particular areas, or for supporting additional areas.

BRIEF DESCRIPTION OF THE DRAWINGS

FIG. 2A is a from perspective view of the adjustable back support fitted with additional cushions.

FIG. 2B is a side view of the adjustable back support of FIG. 2A.

FIG. 3 is a front perspective view of an adjustable back support in accordance with a second embodiment of the invention.

DESCRIPTION—FIGS. 1A AND 1B—FIRST EMBODIMENT

Figure 1A:
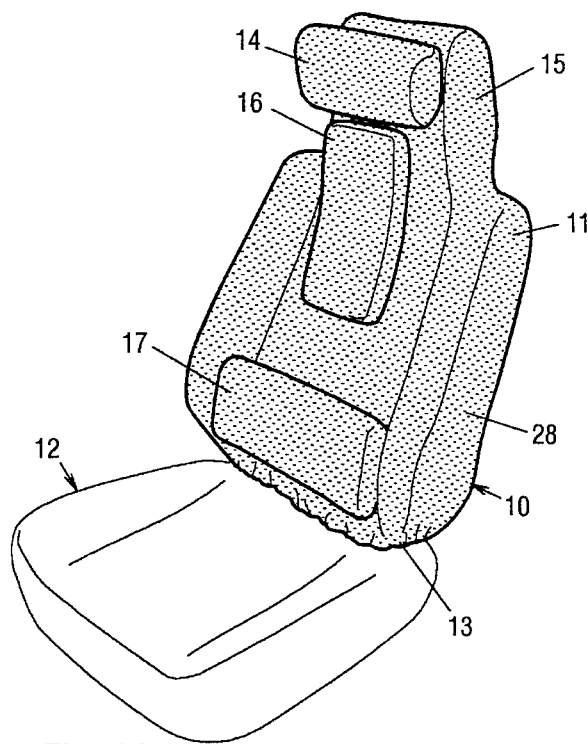
FIG. 1A is a front perspective view of an adjustable back support in accordance with a first embodiment of the invention.

In accordance with a first embodiment of the invention shown in FIG. 1A, an adjustable back support for car seats includes a cover 10 sized and shaped for snugly enclosing a supporting surface or seat back 11 (hidden under cover 10) of a car seat 12. Cover 10 includes a headrest portion 15, a seat back portion 28, and an open bottom end with an elastic edge 13 for girding around the base of seat back 11. It can be made in different shapes and sizes for fitting a variety of car seats. A basic set of three cushions includes a generally cylindrical neck cushion 14 attached horizontally to headrest portion 15; a flat, rectangular upper back cushion 16 attached vertically to both seat back portion 28 and headrest portion 15; and a rectangular lumbar cushion 17 attached horizontally to the lower end of seat back portion 28. The cushions have fabric shells surrounding soft cores (not shown).

Figure 1B:
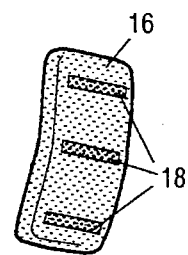
FIG. 1B is a rear perspective view of a cushion of FIG. 1A.

The shells of the cushions and cover 10 are made from sheets of a detachable and reattachable adhesive, such as the hook-and-loop fastener fabrics available from Foss Manufacturing Company, Inc. of Hampton, N.H., under the trademarks VELCRO COMPATITABLE MATERIAL and SHOWTIME DISPLAY FABRIC. The shells and the cover are made of the "loop" portion of the fastener fabric because it is softer to the touch. As shown in FIG. 1B, "hook" strips or complementary adhesive strips 18 are attached to the back side of upper back cushion 16, and similarly to all other cushions (not shown). The "hook" and "loop" fabrics form complimentary adhesive components, therefore the cushions can be attached anywhere on cover 10. Their positions can be easily adjusted by pulling them off, then reattaching them at different locations on cover 10. Because their shells are entirely made of adhesive fabric, the cushions can even be attached to each other, as will be explained in conjunction with FIGS. 2A and 2B. They can be easily removed for cleaning. The simple construction of the adjustable back support makes it economical to manufacture.

In this embodiment, neck cushion 14 is 20 cm wide, 13.75 cm tall, and 8.75 cm thick; upper-back cushion 16 is 12.5 cm wide, 35 cm tall, and 2.5 cm thick; and lumbar cushion 17 is 30 cm wide, 12.5 cm tall, and 7.5 cm thick. The cushions can be filled with foam, cotton fiber, or any other suitable type of filler material.

OPERATION—FIGS. 1C AND 1D—SIDE AND TOP VIEWS

Figure 1C:
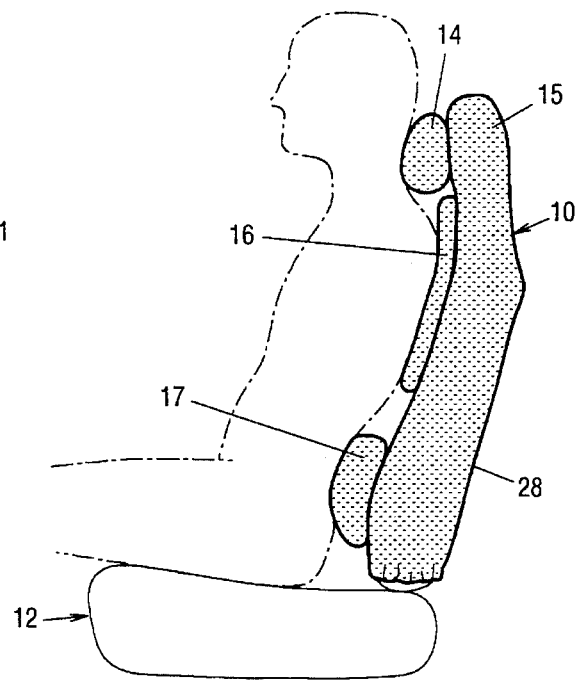
FIG. 1C is a side view of the adjustable back support of FIG. 1A
Figure 1D:
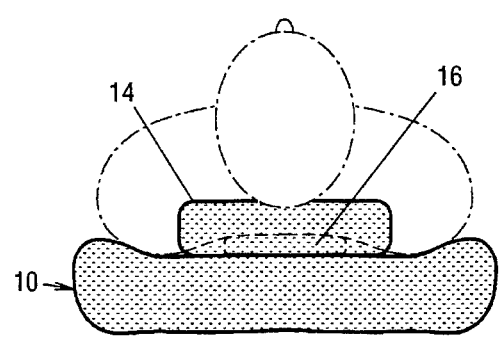
FIG. 1D is a top view of the adjustable back support of FIG. 1A.

As shown in the side view of FIG. 1C, neck cushion 14 is positioned on headrest portion 15 for supporting the user's neck and the lower portion of the head. It is thick and soft enough to conform to the neck and head, so that they are well supported without requiring the user to lean back at all. Neck cushion 14 also acts as a damper, so that it will support the head comfortably, and prevent it from bouncing about even when the car is in motion. Lumbar cushion 17 supports the lower back; it is thick enough to enhance the usually inadequate lumbar support offered by most car seats. Rectangular upper back cushion 16 is sized and shaped for supporting the user's upper back between the shoulders. It pushes the upper back forwardly to keep the shoulders back, as shown in the top view in FIG. 1D (neck cushion 14 is not shown in FIG. 1D for clarity). As a result, the head, back, and shoulders are held in their most comfortable positions.

The positions of the cushions can be easily adjusted to fit individual users. Taller users can place them higher, and shorter users can place them lower. Some of the cushions can be removed if desired, so that two or just one cushion is used. For example, some users might not want to use upper back cushion 16, while some might only want neck cushion 14. Any cushion can be easily removed to suit individual preferences.

OPERATION—FIGS. 2A AND 2B—USING ADDITIONAL CUSHIONS

More cushions can be added if a user desires more support in certain areas. In the example shown in FIGS. 2A and 2B, upper back cushion 16 and neck cushion 14 are attached on top of additional cushions 19 to 22, which are attached to cover 10. These cushions combine to position the user's body more forwardly, and also provide a much more cushy feel on the otherwise firm car seat. Even more cushions than shown can be added if desired. The cushions can also be placed in other positions to suit individual preferences.

DESCRIPTION—FIG. 3—SECOND EMBODIMENT

As shown in the second embodiment of the invention in FIG. 3, the cushions can be attached to a fastening-loop fabric liner 23. It is long and narrow for fitting only in the center portion of seat back 11, and includes a hood or headrest portion 26 for fitting over and covering headrest 27. A pair of straps 24A and 24B, also made of fastening-loop fabric, extend from the lower corners of liner 23. A small strip of fastening-hook fabric 25 is attached to the distal end of strap 24A, so that it can be attached to strap 24B after they are wrapped around the lower end of seat back 11. This allows a single size of the adjustable seat back support device to fit virtually all car seats.

RAMIFICATIONS, AND SCOPE

Accordingly the reader will see that I have provided an adjustable back support for car seats which provides neck, upper back, and lumbar support. The cushions can be easily adjusted to fit different users. Less support can achieved by using fewer cushions, and more support can be achieved by using more cushions. The cushions can even be stacked for additional support and comfort. They hold the back and shoulders in their proper positions, so that the user is placed in the most comfortable seating posture. The cushions can be easily installed on any car seat, and can be easily removed for cleaning. Their simple and economical materials make them inexpensive to produce.

Although the foregoing descriptions are specific, they should not be considered as limitations on the scope of the invention, but only as examples of the preferred embodiments. Many other variations are possible within the teachings of the invention. For example, the shapes and sizes of the cushions can be changed. The number of cushions used can be different from the examples shown. Instead of being made entirely from sheets of adhesive fabric, the shells of the cushions and cover 10 can be made of conventional fabric, then lined with the adhesive fabric. Cover 10 and the shells of the cushions can be made of fastening-hook fabric instead, and the strips on the back of the cushions can be made of fastening-loop fabric instead. The elastic lower edge of the seat back cover can be replaced with a pullstring. Cover 10 can be lengthened to also cover the seating surface of the car seat. The adjustable back support can be easily adapted for use on other types of seats and chairs, such as airplane seats, office chairs, sofas, etc. Therefore the scope of the invention should be determined by the appended claims and their legal equivalents, and not by the examples given.

I claim:

1. An adjustable back support device for fitting onto a seat having a seat back and a headrest, comprising:

an adhesive fabric seat cover having a seat back portion and a headrest portion adapted to fit over said seat back and said headrest, respectively, a plurality of cushions each having an adhesive fabric shell, and a complementary adhesive fabric sheet disposed on each of said cushions for fastening said cushions to each other and anywhere on said adhesive fabric seat cover, whereby said cushions are positionable for supporting different portions of a user seated on said seat, and are easily repositionable for obtaining a desired fit.

2. An adjustable back support device for fitting onto a seat having a supporting surface, comprising:

a fastening-loop fabric sheet adapted to cover said supporting surface, a plurality of cushions each having a fastening-loop fabric shell, and a fastening-hook fabric sheet disposed on each of said cushions for fastening said cushions to each other and anywhere on said fastening-loop fabric sheet, whereby said cushions are positionable for supporting different portions of a user seated on said seat, and are easily repositionable for obtaining a desired fit.

* * * * *